United States Patent [19]

Natelson

[11] 3,915,652
[45] Oct. 28, 1975

[54] MEANS FOR TRANSFERRING A LIQUID IN A CAPILLARY OPEN AT BOTH ENDS TO AN ANALYZING SYSTEM

[76] Inventor: Samuel Natelson, 2458 E. 72nd St., Chicago, Ill. 60649

[22] Filed: Dec. 16, 1974

[21] Appl. No.: 532,947

Related U.S. Application Data

[63] Continuation-in-part of Ser. No. 388,945, Aug. 16, 1973, Pat. No. 3,859,051.

[52] U.S. Cl................ 23/259; 23/253 R; 141/130
[51] Int. Cl.² ................ G01N 1/14; G01N 1/18; G01N 33/16
[58] Field of Search...... 23/259, 253 R, 292, 230 B, 23/425.4 R; 141/130

[56] References Cited
UNITED STATES PATENTS

| | | | |
|---|---|---|---|
| 3,260,413 | 7/1966 | Natelson............................ | 23/253 X |
| 3,489,525 | 1/1970 | Natelson............................ | 23/253 |
| 3,607,079 | 9/1971 | Maxon et al....................... | 23/253 X |
| 3,779,083 | 12/1973 | Ayres et al........................ | 23/253 R |
| 3,807,959 | 4/1974 | Russell et al...................... | 23/259 |

*Primary Examiner*—R. E. Serwin
*Attorney, Agent, or Firm*—George B. Oujevolk

[57] ABSTRACT

In a system for analyzing a fluid such as blood or blood plasma contained in capillaries, the capillaries, open at both ends, are filled with the fluid to be analyzed. These capillaries are carefully calibrated and serve as disposable pipets. The filled capillaries are disposed around a turntable or on a linear transport means and are brought to a work station. Fluid and air are pumped continuously by peristaltic action on flexible tubing through a by-pass tube. When a capillary is brought into position, connection is made with a fluid hose on both ends of the capillaries. Valve means is provided which closes the by-pass and opens the hose leading to the capillary. The fluid and air are now pumped through the capillary. After a predetermined time, the fluid hose leading to the capillary is closed and the capillary is removed. The valve in the by-pass system is now opened so that fluid now passes through the by-pass system. A second capillary is brought into place and the process is repeated until all the capillaries have been processed. The contents of the capillary are washed out, reagents are added, heating takes place if necessary, and finally the component being assayed is evaluated at a readout station.

9 Claims, 34 Drawing Figures

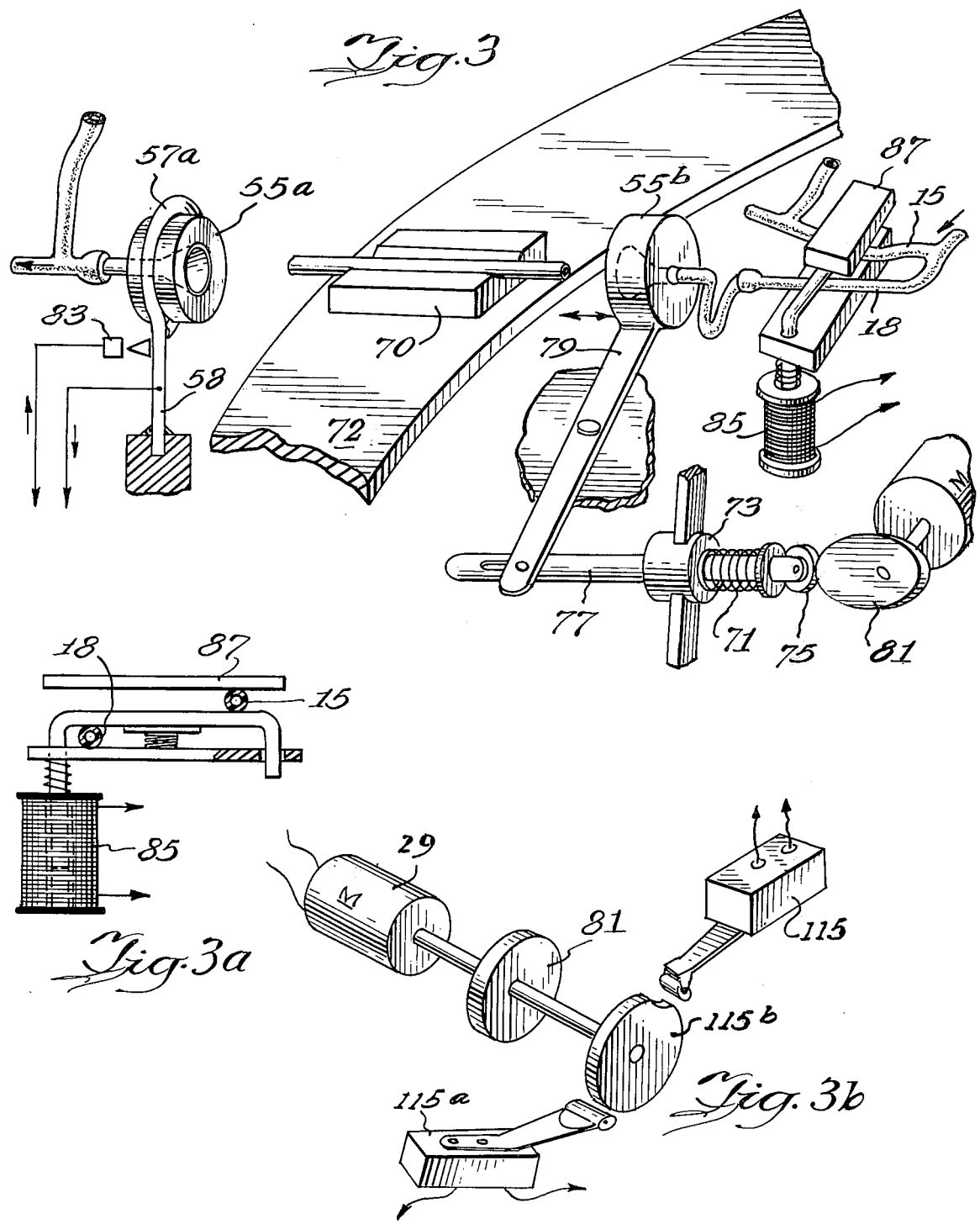

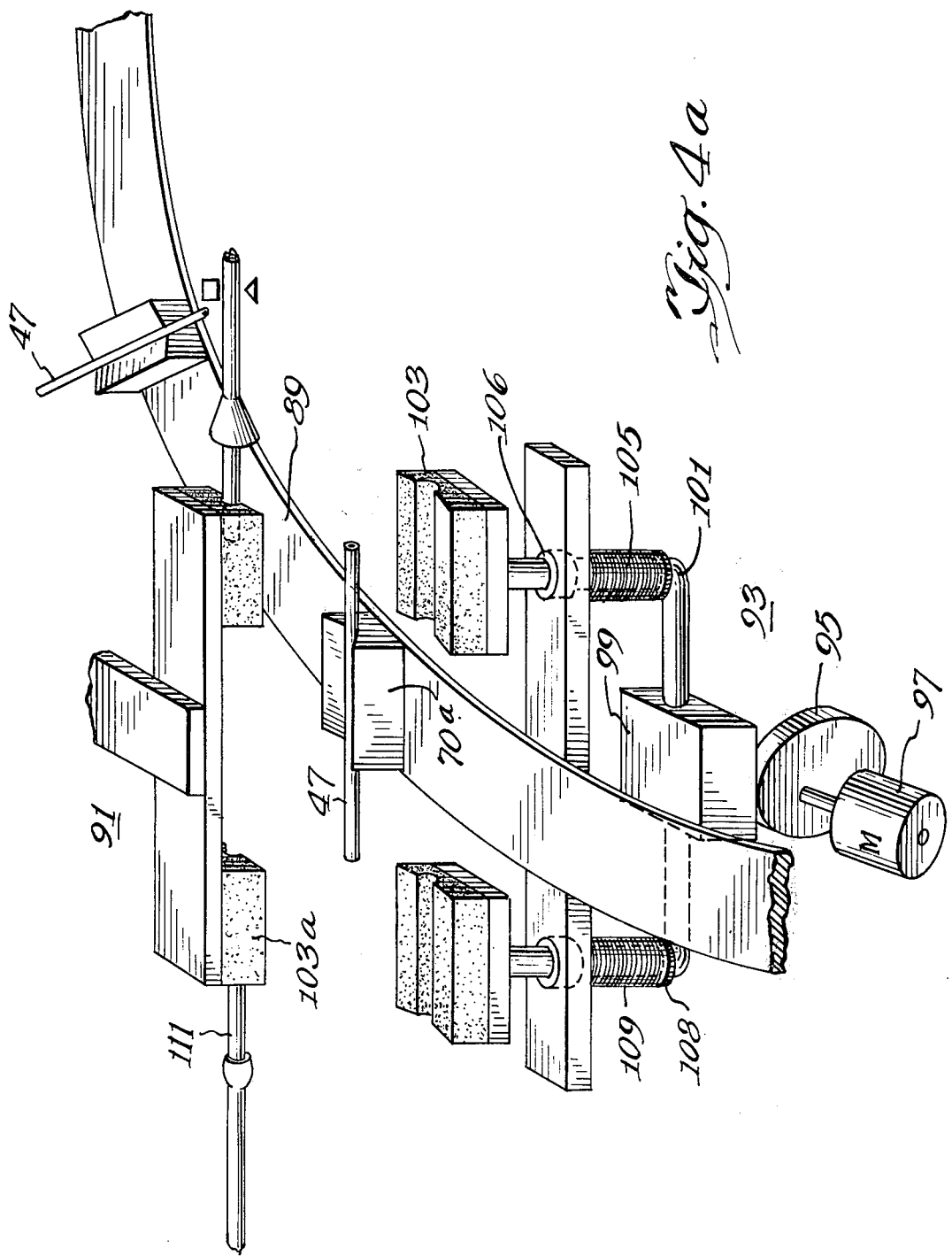

Fig. 4b
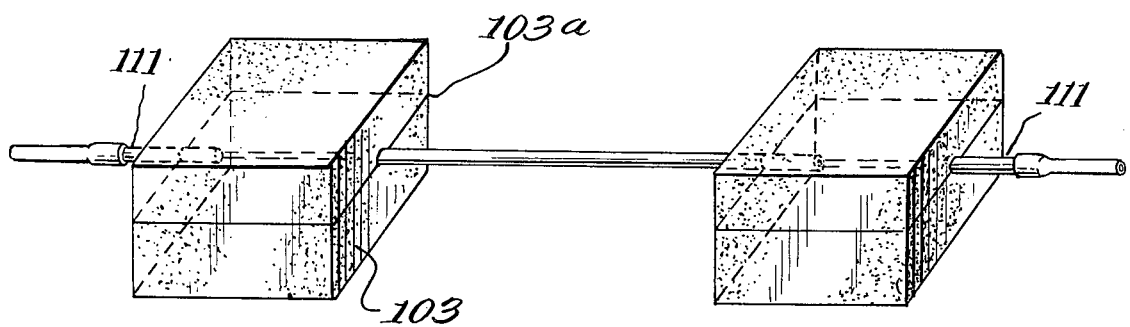
Fig. 4d
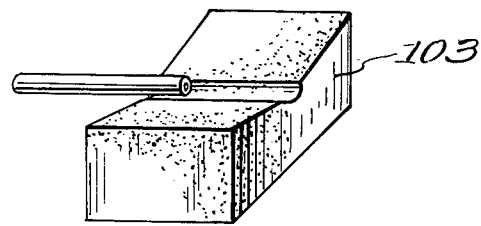
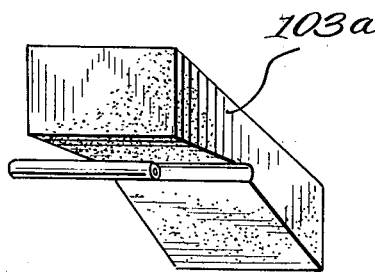
Fig. 4c

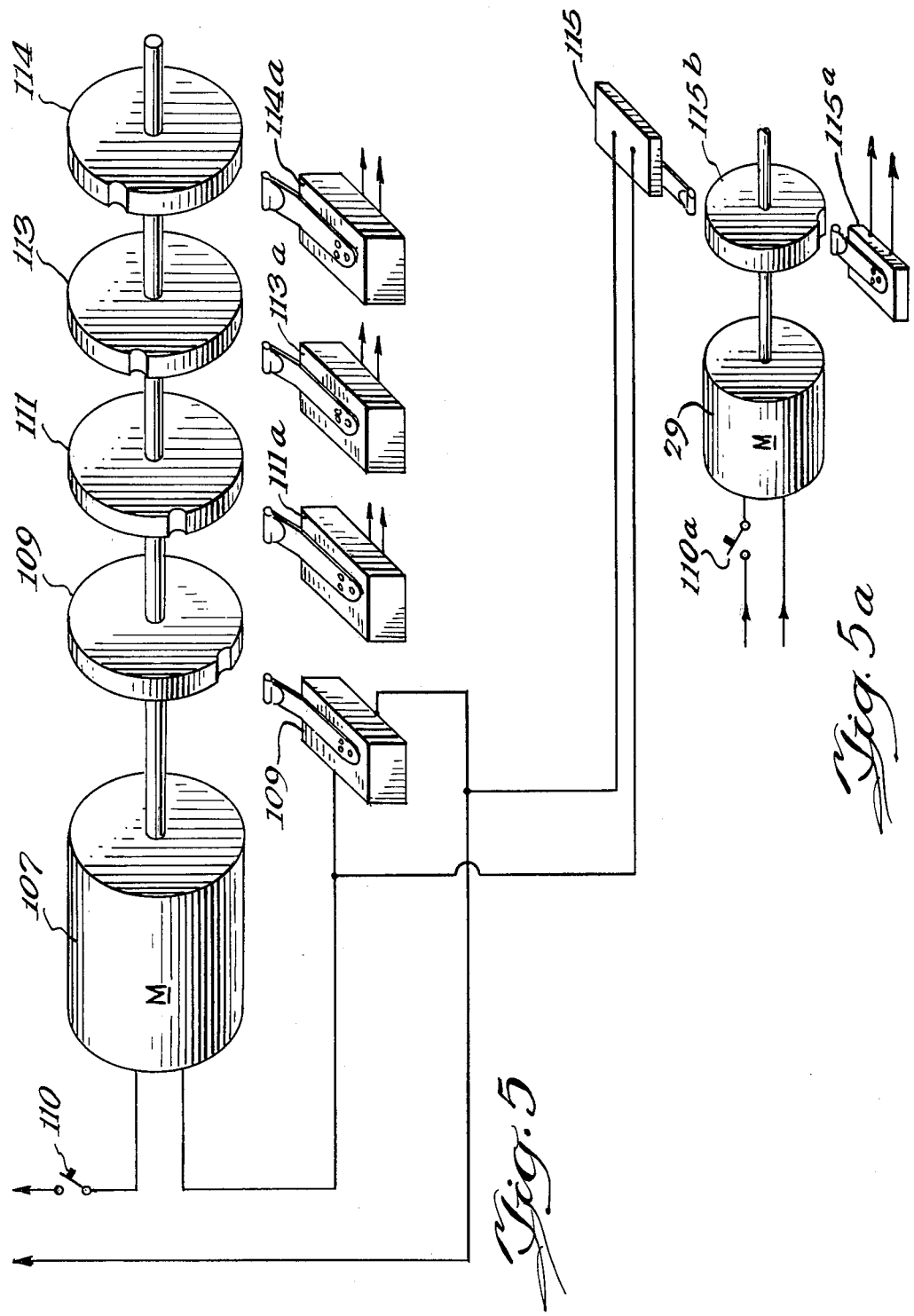

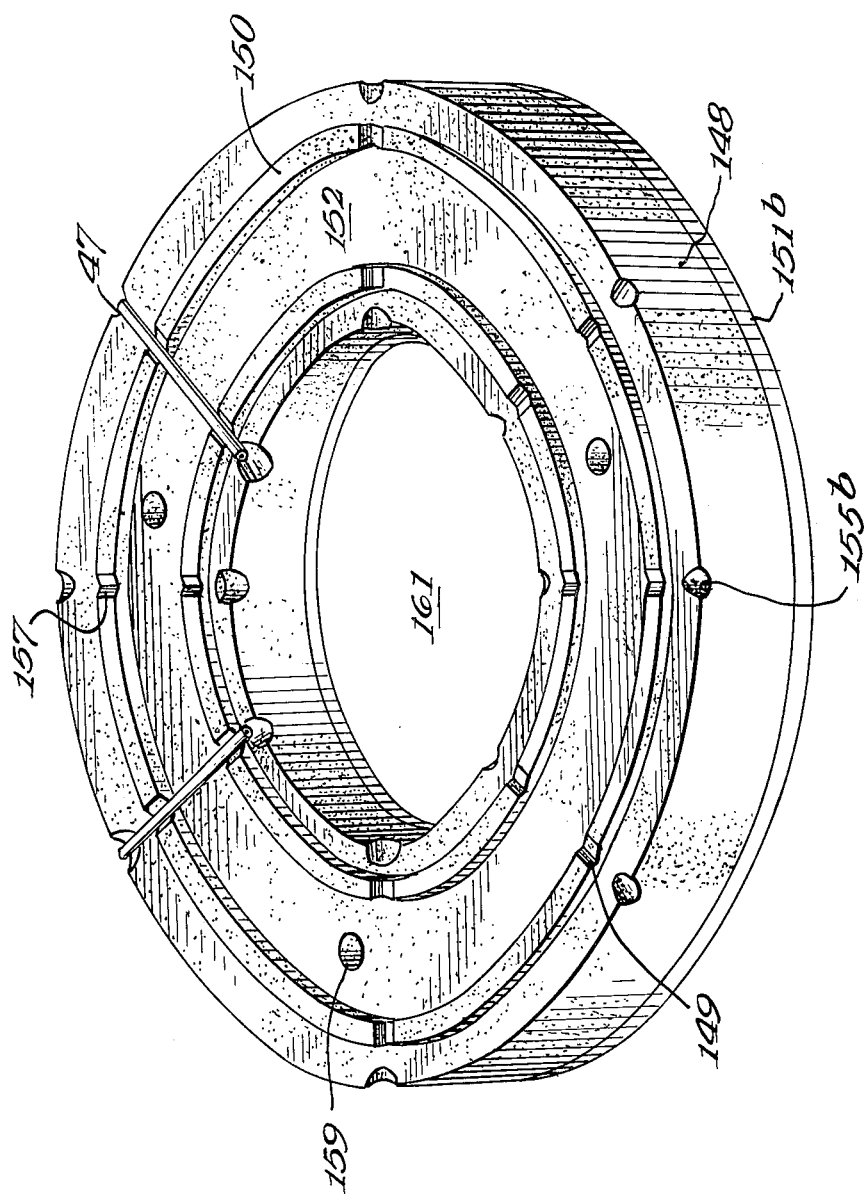

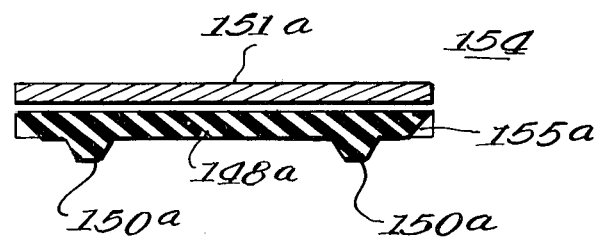
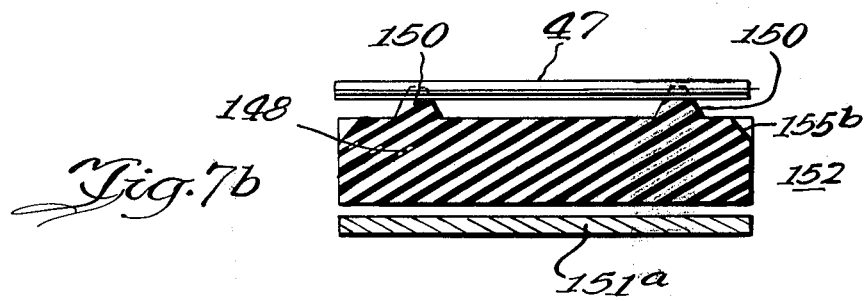
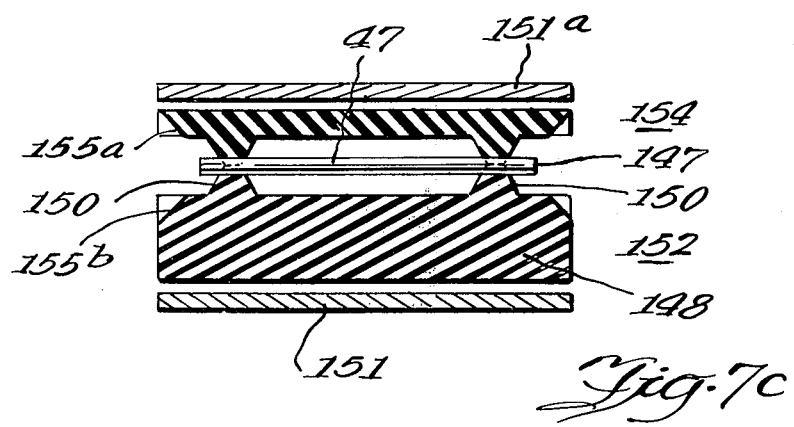

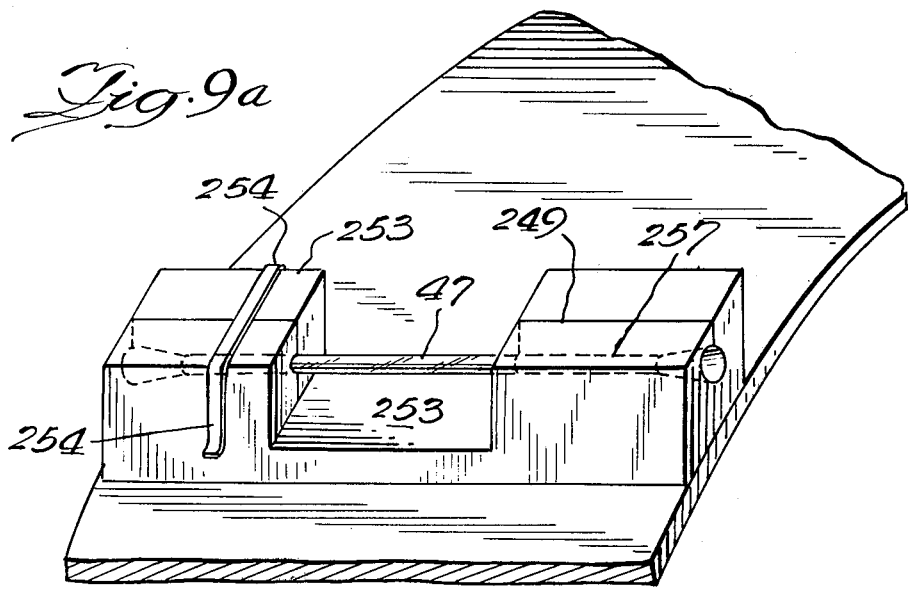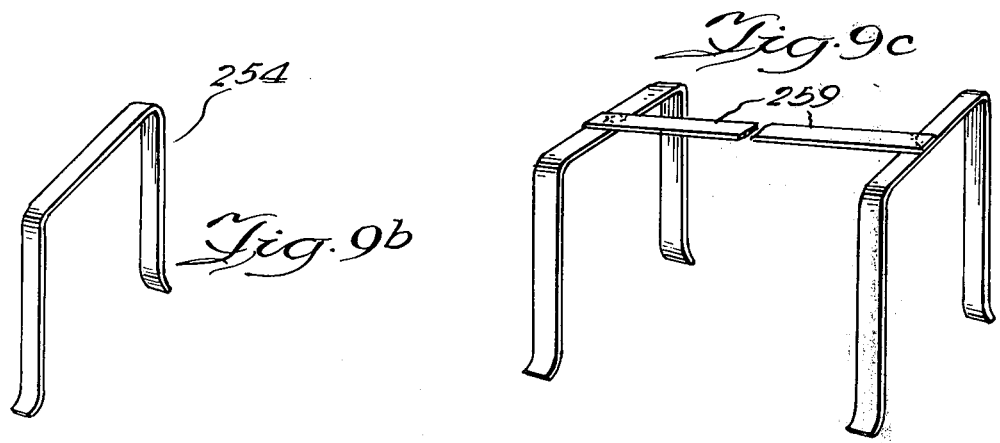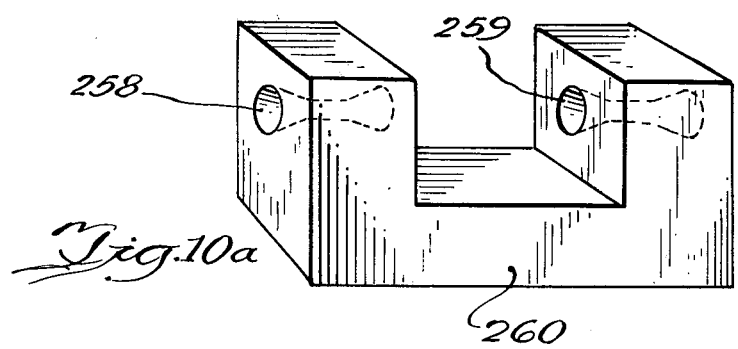

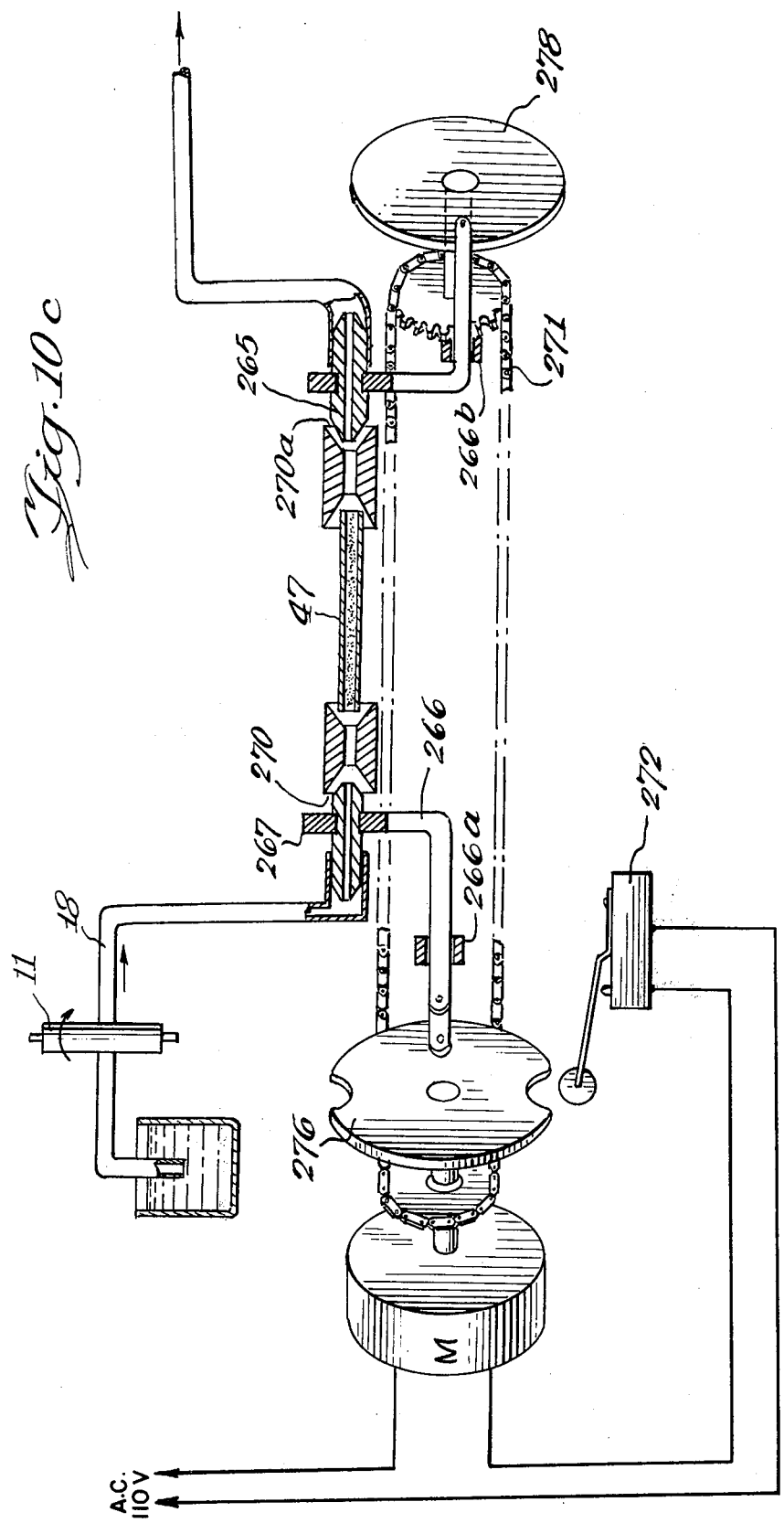

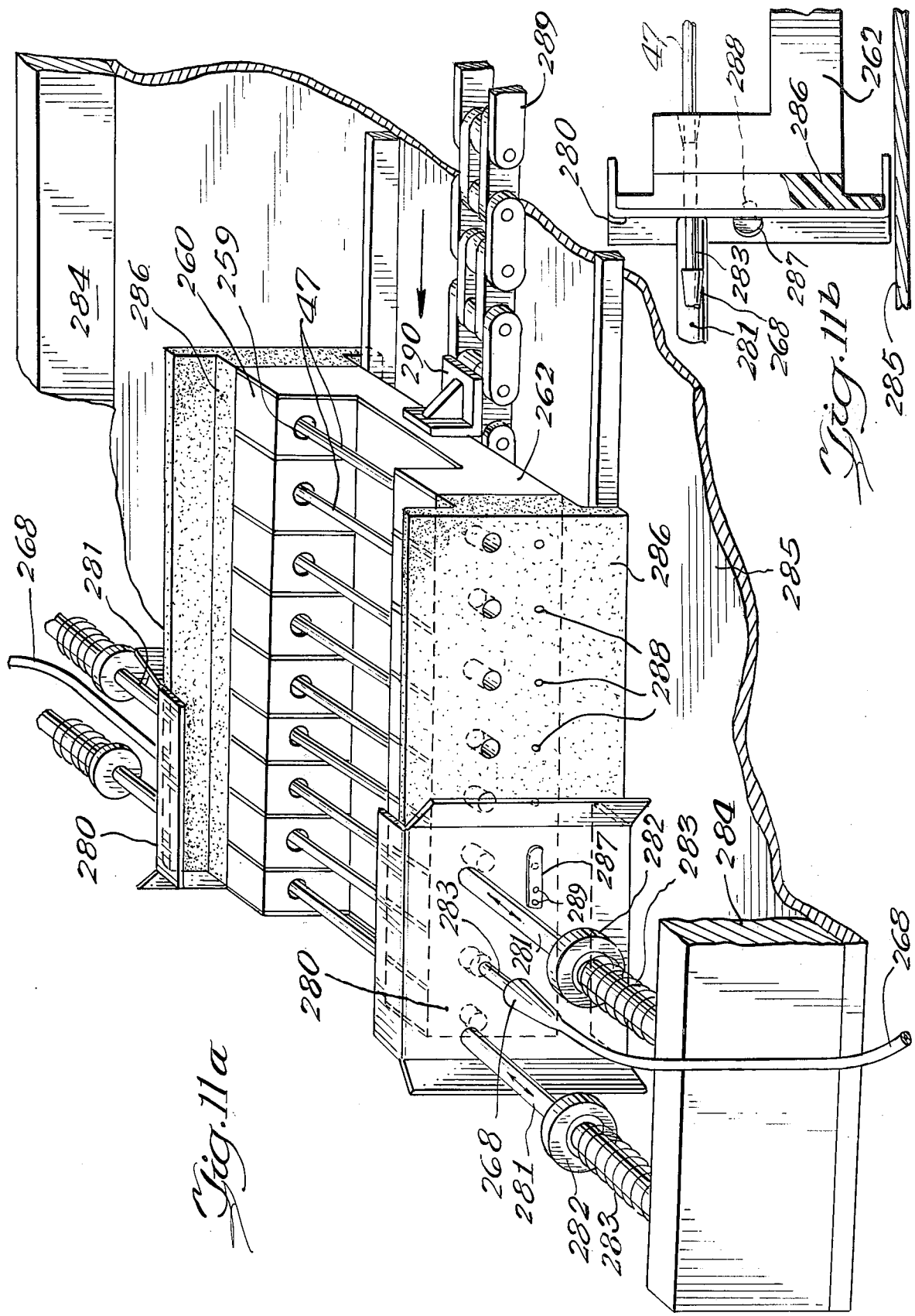

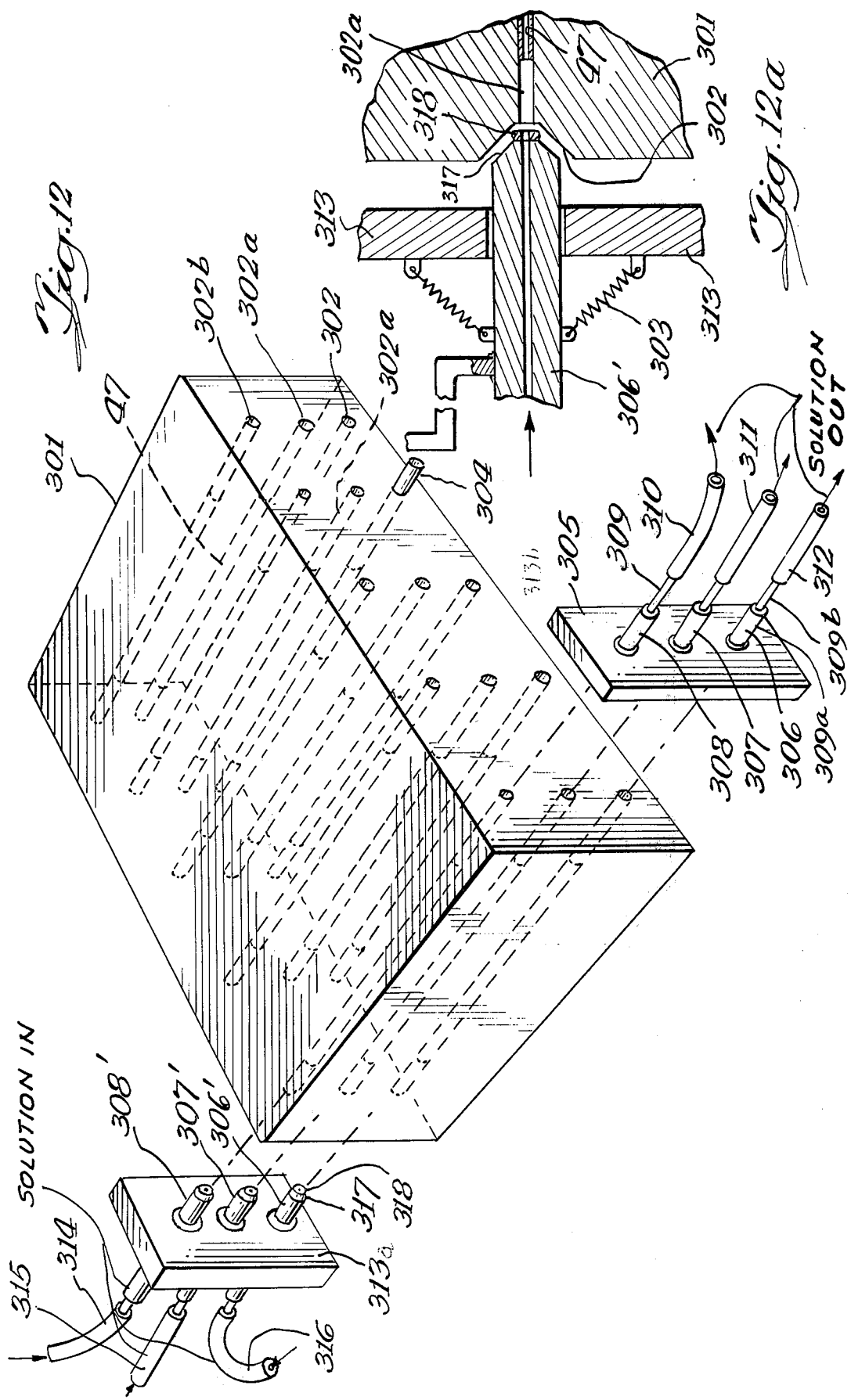

MEANS FOR TRANSFERRING A LIQUID IN A CAPILLARY OPEN AT BOTH ENDS TO AN ANALYZING SYSTEM

This is a continuation-in-part application of Ser. No. 388,945 filed Aug. 16, 1973, now U. S. Pat. No. 3,859,051.

BACKGROUND OF THE INVENTION

The present invention relates to the transfer of liquid from a capillary to a system for chemical analysis, and more particularly to the transfer of a liquid to be analyzed by completely draining out a capillary without disturbing the capillary.

BRIEF DESCRIPTION OF THE PRIOR ART

In earlier patents, procedures are described for processing capillaries in order to remove their contents and proceed with chemical analysis of the contents. Examples of this technique are to be seen in U.S. Pat. Nos. 3,489,525, 3,331,665, 3,260,413 and 3,575,220.

In each case, the contents of the capillary is removed by a mechanical means such as blowing air through the capillary for processing. In one case (U.S. Pat. No. 3,575,220) the contents of the capillary are removed by touching to paper and allowing it to run out.

All of these methods suffer from the fact that some material is left on the walls of the capillary. It is much more accurate to wash out the contents of the capillary into the system of analysis. The present invention provides such an arrangement. Further, when small volumes are used, of less than 10 $\mu l$, the narrow capillary is difficult to empty and holdback on the walls becomes a major limiting factor.

SUMMARY OF THE INVENTION

Generally speaking, the present invention provides for an arrangment for introducing minute quantities of a liquid sample into an analytical system.

A plurality of capillaries, open at both ends are disposed in parallel on a moving means which moves along a predetermined travel path to a work station having thereon retaining means for retaining the capillaries. At the work station, there are flow means providing a continuous flow path having a by-pass and a main path. Wash fluid normally flows through the by-pass. Capillary holding means for passing the wash fluid through a capillary are provided in the main path. Insert means are also located at the work station for inserting a capillary from the moving means into the capillary holding means. Also, coupled to and regulating the insert means and the movement of the moving means as well as the insert means are control means, which will move the moving means one capillary position at a time to the work station, operate the insert means to place the capillary in the main path and simultaneously shut the first valve to the by-pass and open the second valve to the capillary so that wash fluid will flow through the capillary. After the capillary is empty, the capillary is removed from the holding means.

The invention, as well as other objects and advantages thereof will become more apparent from the following detailed description when taken together with the accompanying drawings, in which:

BRIEF DESCRIPTION OF THE DRAWINGS

FIG. 3 gives a perspective explanation of another version of the inventive concept;

FIG. 3a is a detail of the perspective of a valve used in FIG. 3;

FIG. 3b is a switch arrangement useful herein.

Figure 6B:
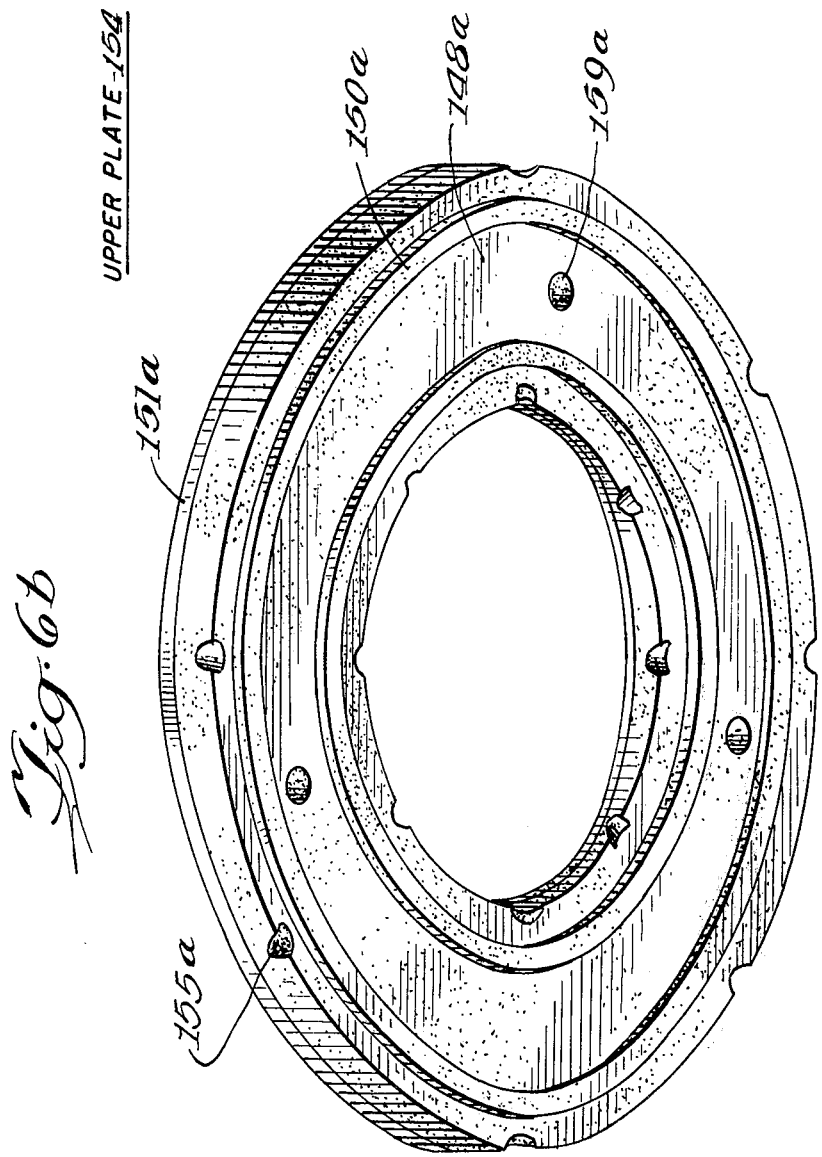
Figure 6C:
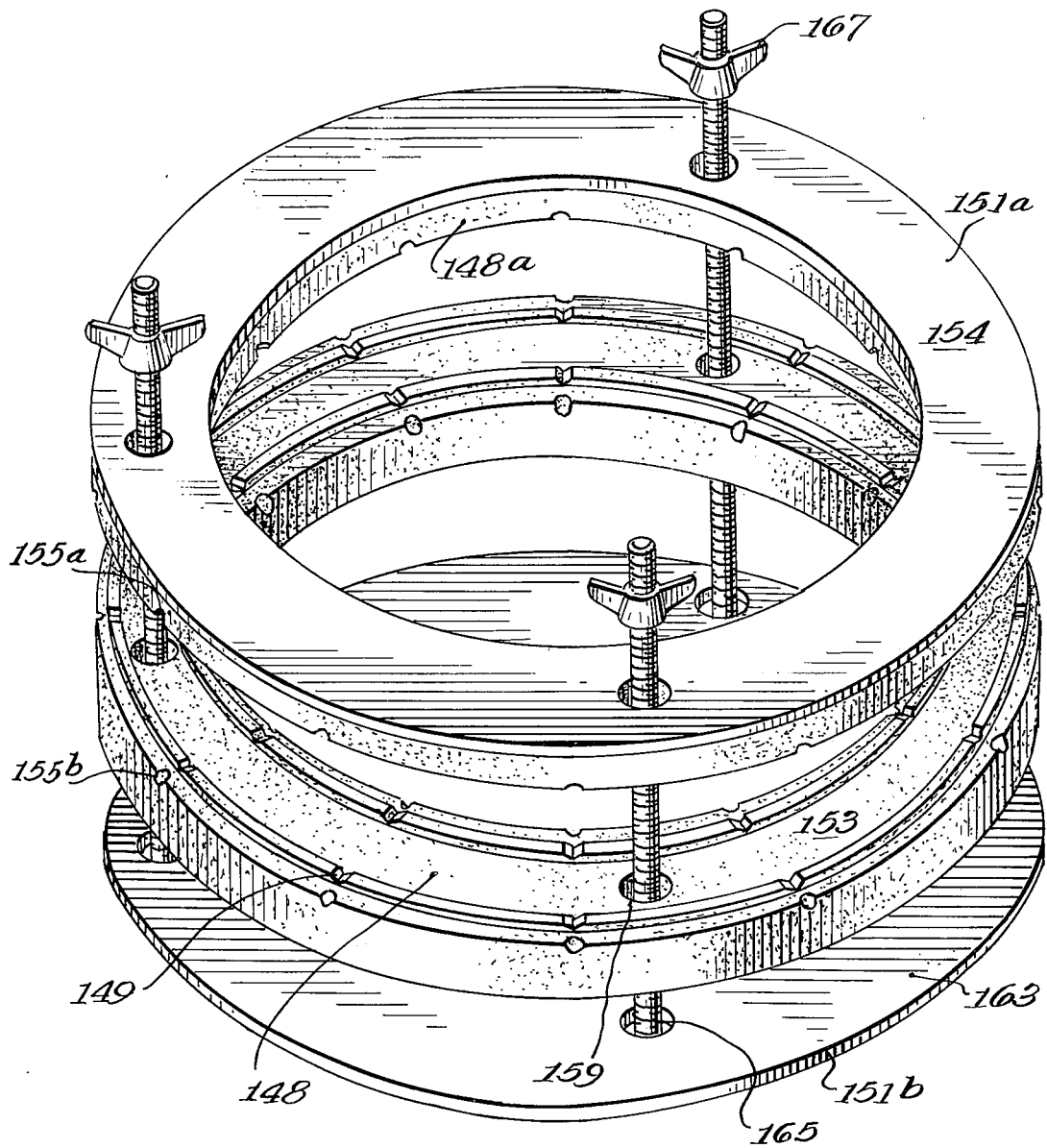
Figure 8A:
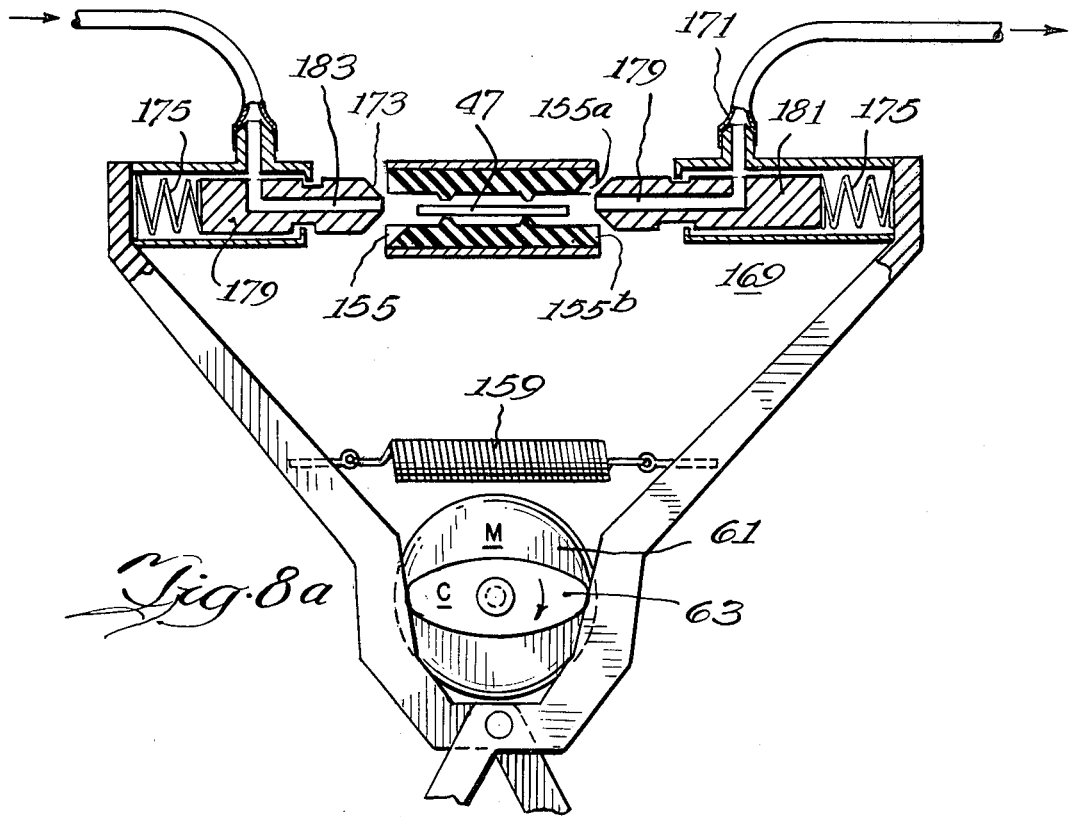
Figure 8B:
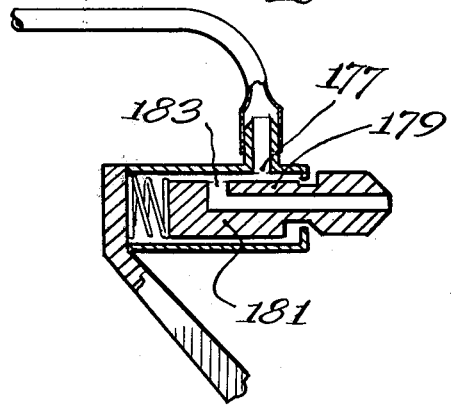
Figure 10B:
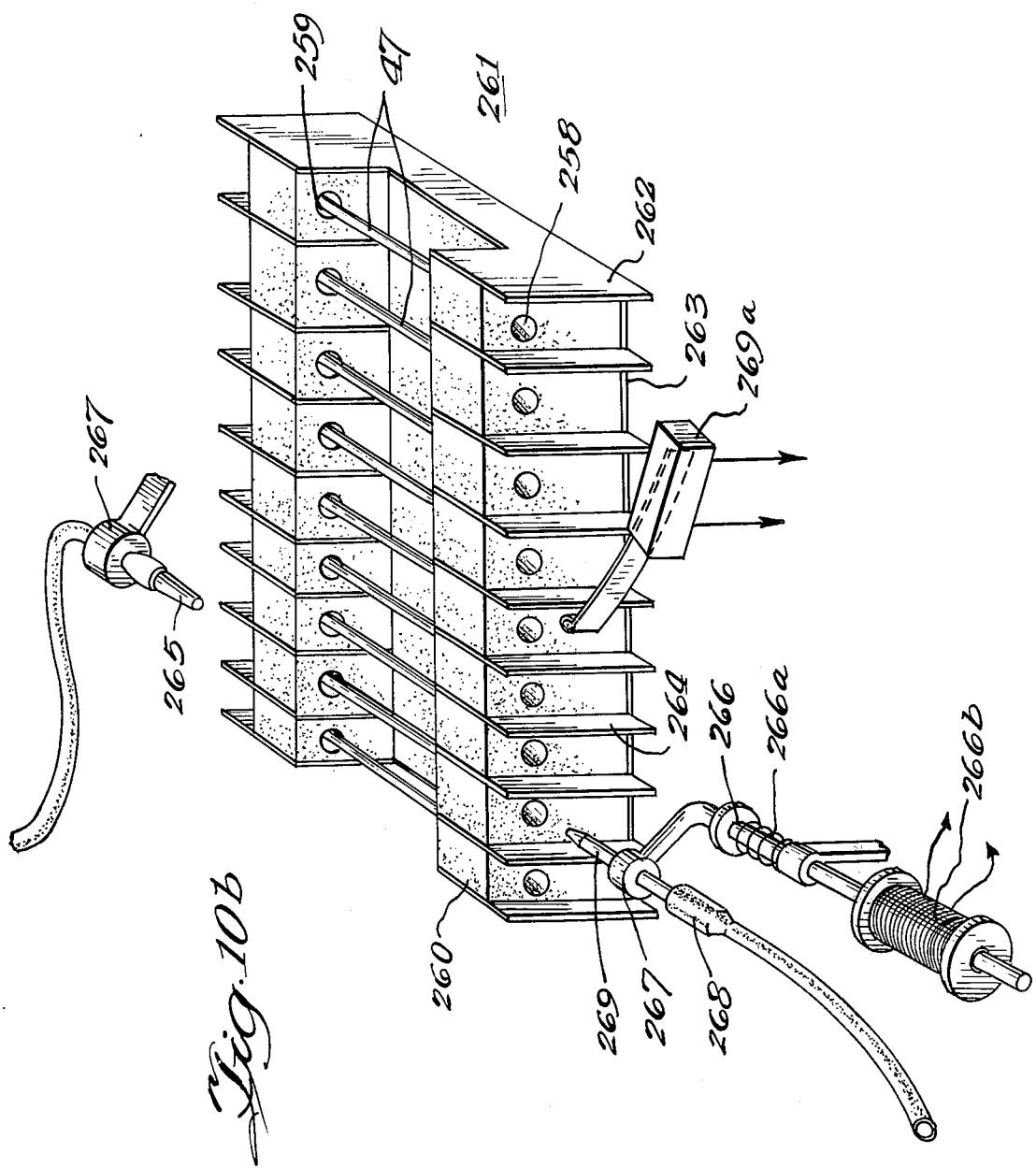

4a gives a perspective view of yet another version of the inventive concept;

FIG. 4b shows in perspective one of the components used in FIG. 4a;

FIG. 4c is a perspective view of one of the units of FIG. 4b;

FIG. 4d presents in a view similar to FIG. 4c, the complementary component to that shown in FIG. 4c;

FIG. 5 and FIG. 5a are perspective explanations of the control arrangement for the instrument described herein;

FIG. 6a shows a lower plate on which capillaries are disposed for another version of the invention;

FIG. 6b is a cover plate placed over and aligned with the lower plate of FIG. 6a;

FIG. 6c illustrates the assembly of the upper and lower plates of FIGS. 6a and 6b mounted on a turntable;

FIG. 7a is a cross-sectional view of FIG. 6b;

FIG. 7b is a cross-sectional version of FIG. 6a;

FIG. 7c is a sectional view of FIG. 7a and 7b in an assembled state;

FIG. 8a presents a sectional view of another version of the inventive concept in the engaged state;

FIG. 8b shows a portion of FIG. 8a, but in the retracted state;

FIG. 9a also shows a perspective view of the inventive concept in another embodiment;

FIG. 9b and 9c illustrate clamps used in FIG. 9a;

FIG. 10a shows a molded plastic or rubber holder for holding capillaries in place;

FIG. 10b is an assembly of the welded rubber holders of FIG. 10a; forming a rack so as to assemble embodiment of the invention; and, FIG. 10c shows a detail of one variant of the embodiment of FIG. 10b.

FIGS. 11a, 11b, 12 and 12a show another variation of the embodiment of FIG. 10b.

DETAILED DESCRIPTION

Figure 1A:
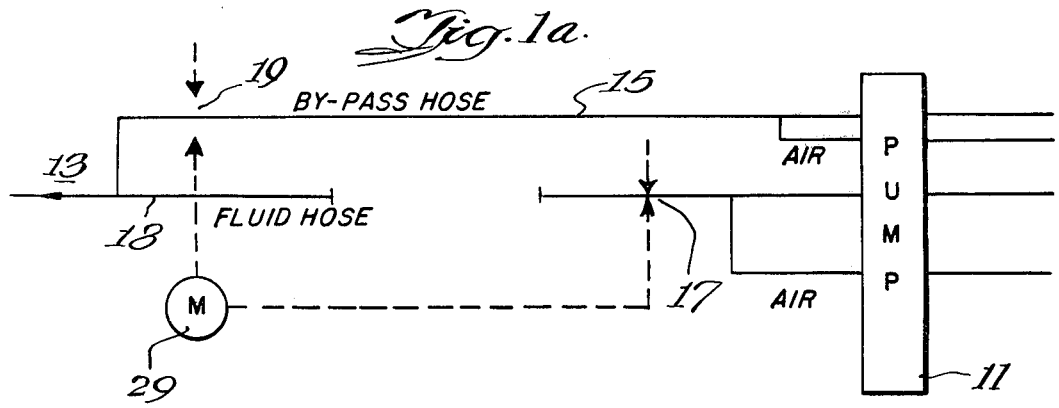
FIG. 1a is a schematic and block diagram of the inventive concept when not acting on a capillary.
Figure 1B:
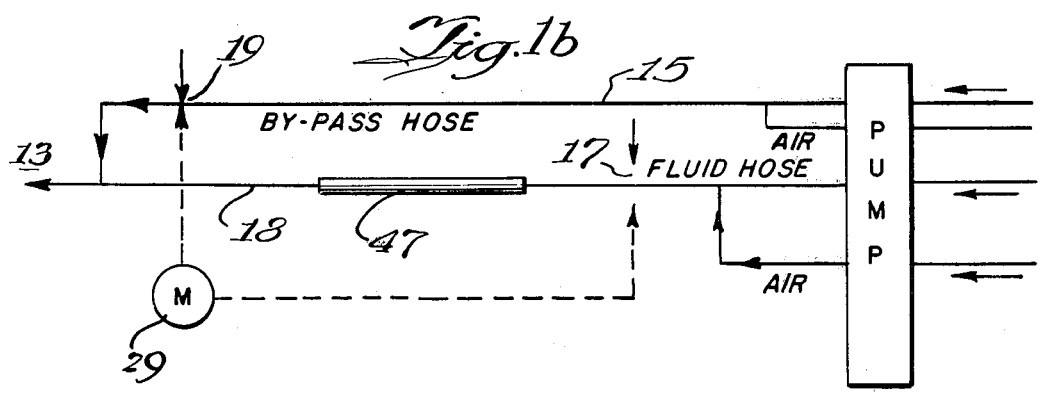
FIG. 1b shows the schematic and block diagram of FIG. 1a when acting on a capillary.
Figure 1C:
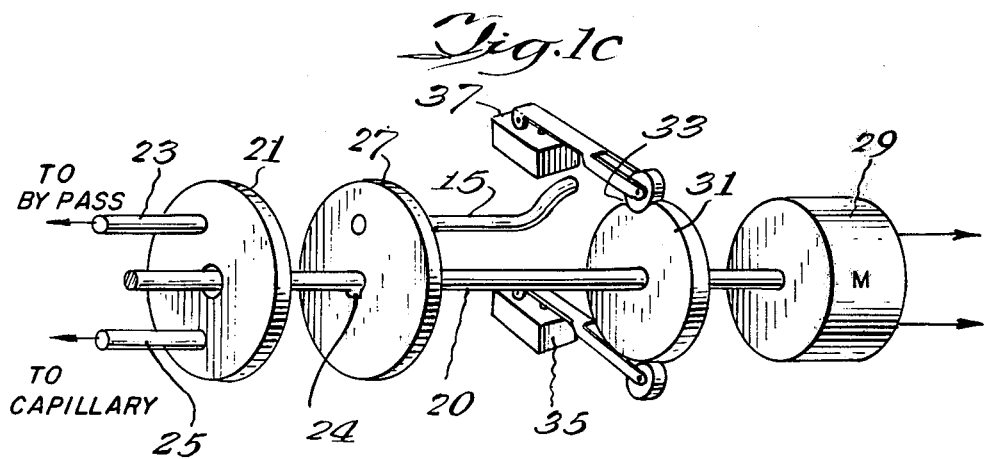
FIG. 1c is a perspective schematic explanation of a valve mechanism.

FIG. 1a and 1b are schematic representations of the principle by means of which this new invention operates. Liquid is propelled by means of a peristaltic pump 11. This action has been described in U.S. Pat. No. 3,489,525. The peristaltic pump 11 is used to move the contents of the capillary to the work station 13 by pushing or by aspiration through the capillary. In the latter case, the peristaltic pump would be placed on the other side of the capillary before the work station. Two paths are provided in FIG. 1a and 1b, the by-pass path 15 goes directly to the work station of analysis, and the other path is the main line 18 and goes to the analysis work station only after it has passed through the capillary. By means of valves 17 and 19, the solution may alternately pass through either of the two paths 15 or 18. Valve 17 and 19 are shown in FIG. 1c and consists of a stationary wheel 21 with two outlets 23, 25, one to "by-pass" and the other to the capillary. Connection to one of the two outlets is made by means of a rotary wheel 27. A reversing motor is provided to turn a cam 31. The cam 31 has a single depression 33 to activate either of two switches 35, 37 180° apart. In the position shown, the first switch 35 is activated and the solution flows to the by-pass. If rotated 180° the second switch 37 would be activated, and the fluid would flow to the capillary. If the motor reverses, the cam 31 would turn 180°, the first switch would be activated and the solution would again go through the by-pass. The two switches are in series with the motor. When either switch wheel falls into the depression in the cam, the motor stops. The method of giving the bypass to the valve of FIG. 1c is shown in FIG. 5a and 5b, and will be hereinafter discussed.

In FIG. 1a there is shown a by-pass hose 15. The by-pass tube valve 19 is open while the fluid hose line 18 is clamped shut so that no fluid flows through the capillary line. In FIG. 1a there is no capillary in place.

In FIG. 1b the capillary 47 is shown in place. The by-pass hose valve 19 is clamped shut and the fluid hose valve 17 to the capillary is open. The fluid now pumps through the capillary washing it out completely and bringing its contents to the zone of analysis.

Figure 2:
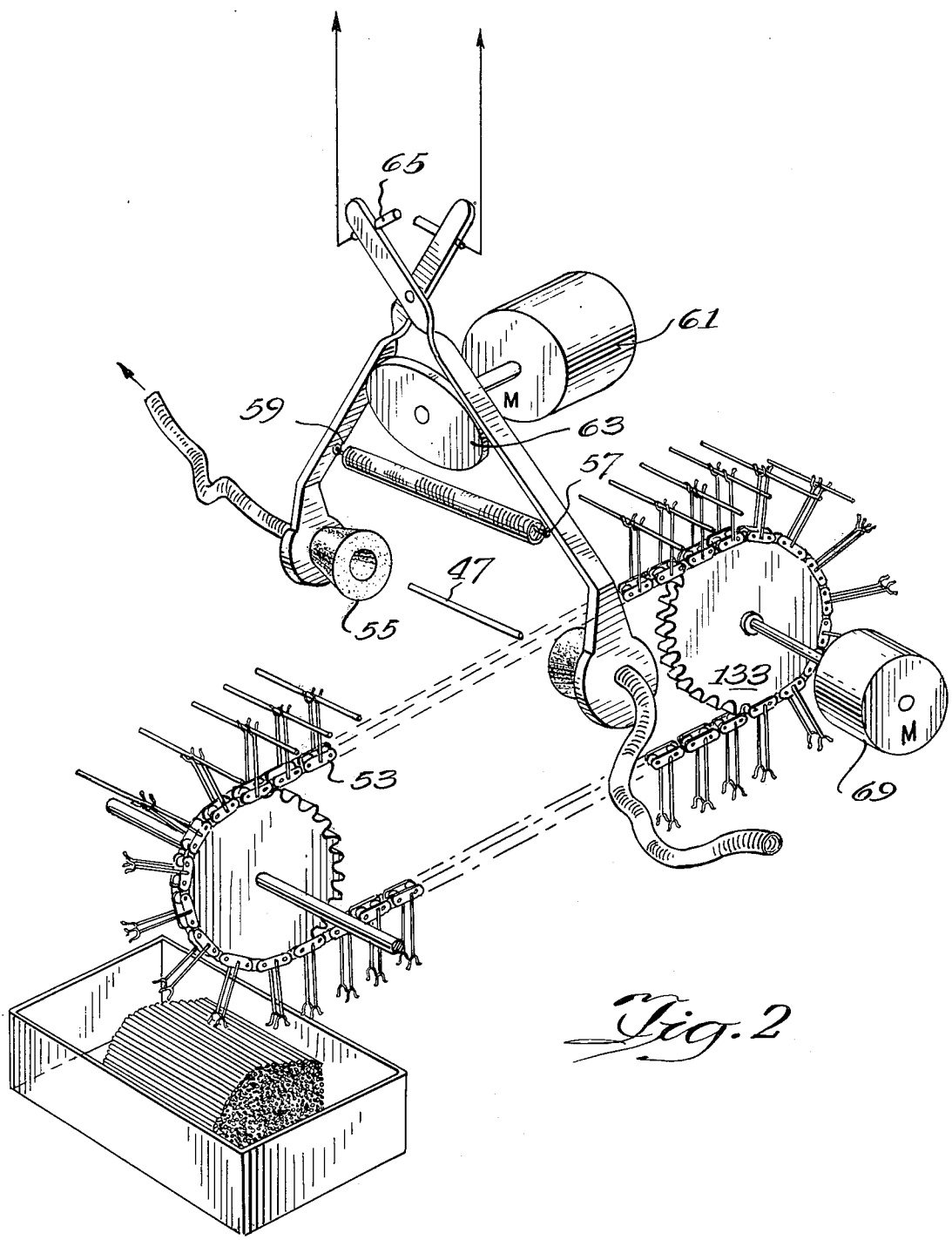
FIG. 2 presents a perspective explanation of one version of the inventive concept.

FIG. 2 shows one form of the instrument. The capillaries 47 are held in claims 51 on a chain drive 53. Each capillary 47 comes into position between two rubber or plastic receiver funnels 55. Silicone rubber is very suitable for this purpose. These funnels are held by pincer-like clamps 57 pulled together by a spring 59. A motor 61 driving an oval cam 63 alternately spreads the pincer apart and lets it come together. When the pincer comes together, the funnels engage both ends of the capillary 47 and a seal is formed. A pair of limit rods 65 prevent excessive pressure on the capillary. These limit rods also close a circuit as they come together. This signals the valve motor 29 shown in FIG. 1c so that the flow now goes through the capillary instead of the by-pass.

Figure 2A:
FIG. 2a illustrates one system of holding capillaries in cross-section.
Figure 2C:
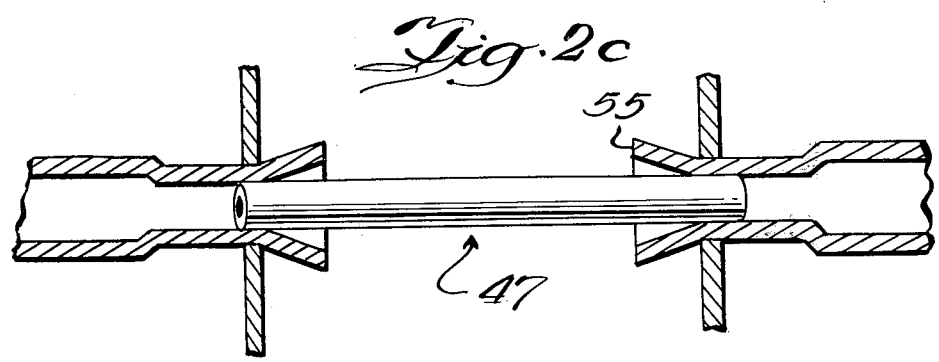
FIG. 2c again shows another system of holding capillaries in cross-section.
Figure 2B:
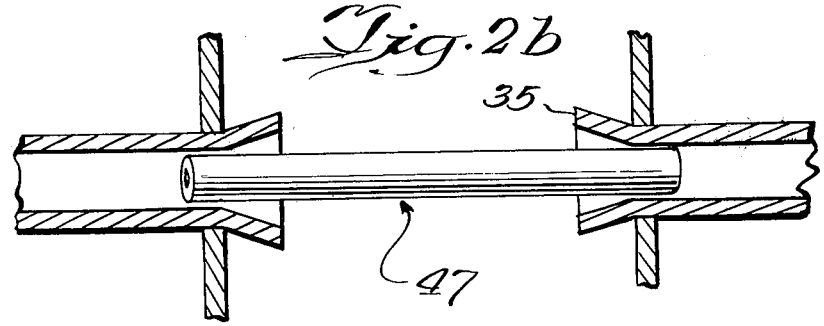
FIG. 2b shows another system of holding capillaries in cross-section.

In FIG. 2 the fluid hoses to and from the capillary are provided with slack so as to permit the connection to the capillary to take place. In FIG. 2a, the capillary abuts the receiver funnel to make a seal. In FIG. 2b the opening of the tubes at the base of the funnels is slightly larger than the capillary so that the capillary slides into the tubes at both ends. As the spring draws the funnels together, it stretches the hose which causes it to tighten on the capillary and provide a seal caused by the constriction of the flexible hose as it is stretched. This is shown in FIG. 2c.

In the embodiment of FIG. 2, the capillaries are brought sequentially to the work station on chain 53, by motor 69 which is activated intermittently by the mechanism of FIG. 5.

After a predetermined period of time, the funnels are moved apart by the oval cam 63. The chain 53 advances, driven by the chain motor 69 and the next capillary is brought into place for processing. As the washed out capillaries go over the end of the sprocket, they drop into a box or catch basin for disposal.

Another variation of this instrument is shown in FIG. 3. In this case, the pincer clamps of FIG. 2 are replaced by a first silicone rubber funnel 55a in a flexible steel clamp 57a. The capillary is held in a bed 70 on a circular plate 72. It moves into place and is pushed toward the funnel 55a held in flexible steel support 58. This is accomplished by a spring 71 opposite to the first funnel and located between a bearing support 73 and a spring stop 75 secured on a slide rod 77. A motor driven cam 81 alternately releases or pushes the slide rod 77, thus compressing the spring. This causes a second rubber funnel 55b attached to a pivoted rod 79 to alternately push on the capillary or be pulled back. Thus, the slide rod 77 is operated by cam 81. When the cam releases the spring 71, the second funnel 55b moves forward and engages the capillary. It now slides it forward in its bed 70 into the funnel 55a supported on the flexible steel support 58, pushing the funnel 55a backwards. The capillary is now held securely between the two funnels 55a, 55b. The movement of the flexible steel support 58 closes a switch 83 which inactivates a solenoid 85 to open fluid hose 18 leading to the capillary. This closes the by pass tube 15 by pressing the tube to metal support 87. When the solenoid 85 is activated the armature is pulled back so as to seal the tubing leading to the capillary and open the by-pass tube. When solenoid 85 is again inactivated, the flow is only through the capillary, and this happens only when a capillary is in place.

After a predetermined time, the motor operating the cam 81 is activated from a central control box shown in FIG. 5 and the cam moves 180°. This pushes the slide rod 77 releasing the capillary. The flexible steel support 58 also pushes the capillary close to the original position it held on the turntable. As the turntable moves over, the capillary continues to be pushed back as it slides out of and leaves the first funnel 55a. The capillary thus ends up essentially in its original position and the process is repeated.

In FIG. 4a the capillaries 47 are alternatively disposed on a circular ring 89 which rotates under the control of a Geneva movement which moves the capillaries sequentially to the work station. The capillaries 47 are placed in soft plastic supports 70a. The work station 91 has a lift mechanism 93 consisting of a lift cam 95 operated by a motor 97 disposed to move under the circular ring 89. A lift plate 99 is disposed over the cam 95. This will be lifted and lowered by the cam thus lifting a U-shaped member 101 wherein the "U" is carried by the plate 99. At the upper ends of the U-shaped member are silicone rubber supports 103 sealed to metal backing, which are normally below the level of the circular ring 89. The arms 105 of the U-shaped member on which these supports 103 are mounted act as thrust rods which go through bearings 106. A spring stop 108 is mounted on the thrust rod so as to support the spring 109 forcing the lift plate 99 down on a lift cam 95 operated by a motor. 105 is a second spring and spring stop assembly.

When the capillary 47 comes into place, the lift cam 95 causes the lift plate to rise, compressing the springs 109 and 105. The silicone rubber supports 103 now lift up the capillary 47 from its position on the turntable, to bring it flush with a corresponding silicone form 103a also with a metal backing which is mounted rigidly. The cam 95 forces the capillary into line with a nipple 111 from the flexible tubing so as to cause fluid from a peristaltic pump to flow through the capillary to an analyzer. The valve to the by-pass is opened when the lift cam is in the position to lift the lift plate. The valve of the by-pass tube is closed at this time. When the lift cam rotates 180° the press plates drip down returning the capillary to its original holder. The valve to the by-pass now opens and the fluid valve to the capillary is now closed. The solution then moves, driven by the peristaltic pump, through the by-pass tube.

The action of the instrument in FIG. 4a depends upon the shape of the support 103 designed to grasp the capillary 47 and hold it in the fluid hose line. In FIG. 4c the lower rubber support 103 is seen which is to be lifted to meet the bottom part of the upper form 103a in FIG. 4d. The forms support's surface are biased so as to cause the capillary to roll into the center channel. A nipple 111 is sealed to the upper rubber form 103a. As the lower support and the upper form meet and are pressed together, the center channel remains open but the resilient rubber forms a flat seal with the nipple 111 on one side and the capillary on the other. This can best be seen from FIG. 4b where the assembly is clamped together making a passageway from fluid nipple 111, through the center channel and finally through the capillary to the second clamped assembly.

FIG. 5 is an explanation of the control circuit 10 which controls all operations. A timing sychronous motor 107 turns so that a cycle is complete every 50 seconds. A second timing synchronous motor 29 complete a cycle in 60 seconds and turns cam 115b. Normally, the synchronous motor would turn until a first switch 109a in series with motor 107 falls into the depression opening the circuit. The motor 107 then stops. The second, third, etc., cams 111, 113, 114 are now aligned in their proper position. On signal from by-pass switch 115 which is now closed momentarily, motor 107 will start, compress switch 109a and continue to complete a cycle, that is until switch 109a again falls into the depression of cam 109.

When switch 111a is tripped, it gives a by-pass to the movement which moves the turntable or chain one space. When the switch 113a is tripped it causes the flow of fluid to go through the by-pass. The cycle is then repeated as the synchronous motor continues to run. If a by-pass is not given, the synchronous motor will stop itself when switch 109a opens.

In operation, one activates motor 107 by closing switch 110. The motor completes a cycle and stops. One then closes switch 110a. Motor 29 now cycles periodically giving a by-pass to motor 107. This causes motor 107 to complete a cycle activating all the components of the system. It then stops and waits for a second by-pass from switch 115. Motor 29 runs therefore slower than motor 107 in order not to upset the order of the system.

FIG. 5a also shows how the signal from cam 39a is relayed to the motor of FIG. 1c. The circuit of work motor 29 goes through two switches 115 and 115a 180° apart which are in series with each other. If either switch is in one of the depressions of cam 115b, the motor stops, i.e., the motor runs until one of the switches falls into the depression when the motor stops. A by-pass from switches 40, 40a will start the motor going. Thus, the motor will turn the cam 180° each time and then stop. This is also seen in FIG. 3b as it alternately gives a by-pass to the solenoid value of FIG. 3a.

In FIGS. 1 through 4, the capillary is secured at the ends to make a seal so that liquid may flow through it. In FIG. 4a the capillary is lifted to the work station. This same purpose may be accomplished by clamping the capillaries to a table in such a way that they are secured within a flexible clamp made of rubber or plastic. The mechanism bringing the fluid to the capillary does not touch the capillary but brings the fluid to the rubber clamp and also removes it from the clamp. This has the advantage that the capillary is protected from breakage. How this is accomplished may be seen in FIGS. 6a, 6b and 6c.

The capillary 47 filled with sample is placed in a recess in a plate assembly 153 having a circular lower plate 152 made of soft rubber 148 approximately ½ inch thick and backed with metal 151 for support. Two ridges 150 circle the plate and have recesses 149 in them to act as a bed 157 for the capillary 47, but still prevent the edges of the capillary from touching a surface. This is done to prevent fluid from leaving the capillary by capillary action. The edges of the capillary are at the beginning of a flare 155a or widening opening. The object of the flare is to eventually form a rubber funnel 155 as in FIG. 2 and 7c. The circular lower plate 152 has three holes 159 for attachment to a turntable 161 and an upper plate 154 or cover.

The upper plate 154 is seen in FIG. 6b and is similar to the lower plate 152 in FIG. 6a. It also has two ridges 150a, but is made of softer rubber 148a (silicone) and does not have depressions in the ridges. This upper plate is a cover and aligns with the lower plate by means of the three holes 159a. It also has upper flares 155c, and a metal backing 151a.

The lower plate 152 after loading, usually with 40 capillaries, is placed on the turntable 163 as in FIG. 6c by threading the holes on three binding posts 165 rigidly secured on the turntable. The upper plate 154 is now threaded on the binding posts 165 of the turntable so that the lower rubber 148 faces the upper rubber 148a. Wing nuts 167 are now tightened so that the upper ridge 150a is compressed forming a double seal, one for each ridge around the capillary. The flares 155a, 155b on the upper and lower plates now meet to form a funnel 155.

In FIG. 7a, a cross-section of the top plate is shown to show the two ridges 150a, rubber 148a and backing metal plate 151a. FIG. 7b shows a cross section showing the capillary 47 resting on the lower ridges 150 of the lower plate 152 supported on rubber 148 and a backing metal plate 151. The ends of the capillary do not touch. In FIG. 7c, a cross section is shown showing how the upper plate 154 meets the lower plate 152 and how a funnel 155 is formed from the flares 155a and 155b on the upper and lower plate.

In the case of FIG. 6a through 7c, the fluid is brought to the capillary by detents 169 which contain a valve system 171. This is shown in FIG. 8a and FIG. 8b. The detents are inwardly biased by a clamp and spring arrangement 159 similar to that hereinbefore described. The detents 169 have nipples 173 which can be pushed back and will return because of an enclosed weak spring 175, in the casing of the detent assembly. As the nipple 173 is pushed back, the spring is compressed as in FIG. 8b, the feed line opening 177 is blocked by the detent wall 179 acting as a piston 181. When the spring 175 is allowed to expand, the piston 181 of the detent 169 moves forward aligning an opening 183 in the piston wall 179 with an opening in a loose connection. In FIG. 8a, two such detents have slipped into the funnels 155 created by the flares 155a, 155b of FIG. 6c and 7c when the upper plate is fastened to the lower plate. As the detent moves around the inner and outer part of the clamped plates in FIG. 7c, it encounters a depression of a funnel 155 followed by a smooth surface and a second funnel-like depression, etc. As the table rotates, the mounted detents shown in FIG. 8a encounter the series of funnels 155 followed by smooth walls. Thus, the detents 169 slip into the funnel like depression opening the flow path through the capillary 47. As the capillary 47 moves away, the detents 155 move out of the depression and like in FIG. 8b are pushed back sealing off the liquid flow. This continues until all the capillaries on the table have been emptied.

A variant of this same idea is to mold a form 253 which is to be fastened on a turntable with cement. FIG. 9a shows such a rubber mold from 253. The operator pushes the capillary 47 down the slits 249 to the channel in the rubber mount 257 designed to hold it. The rubber mount 257 in this case is of a higher durometer of approximately 70 − 80 so as to hold the tube firmly. A clamp in the form of a single spring clip 254 or double spring clip 254a may also be used to tighten on the rubber mount 253. The spring clips serve to clamp the slit rubber mount 253 together and hold it tightly. The molded forms 253 are disposed around a turntable and serve the same function as that of FIG. 6c, which clamp the capillaries with a cover.

A modification of FIG. 9a is to use a single molded rubber form 260 in the shape of a double funnel, 258 and 259, as shown in FIG. 10. These are made of flexible plastic or rubber so that the operator can push them back and insert a capillary loaded with sample. As they spring back they hold the capillary tightly. The flexible forms also may be mounted in a circular or linear mode. In FIG. 10b they are mounted in a linear mode ganged together to form a rack 261.

Approximately 20 of the molded soft rubber forms with double funnels 258, 259 shown in FIG. 10a are stacked with a metal spacer 264 between them as shown in FIG. 10b. The metal spacers extend on both sides 262, although only one side is needed, so as to be able to intercept a trip switch 269a. The operator inserts the loaded capillary 47, full of sample, into the two opposing holes so as to form a seal. The flexible rubber can be pushed back and forth somewhat between the spacers permitting the insertion of the capillaries. The whole rack rests and is sealed to a metal plate 263.

The operator now places the rack in the track of the slide mechanism as shown in FIG. 1 of U.S. Pat. application No. 156,285, now U.S. Pat. No. 3,802,782. The spacer extensions take the place of the test tubes so that the rack advances one spacer and stops. The nipples 269 and 265 are now inserted on both sides and the peristaltic pump pumps the fluid from a reservoir to the analyzing system washing out the capillaries. Flow is through tube 268 to nipple 269 held by clamp 267 to armature 266 of solenoid 266b through the capillary and through the nipple 265 to be analyzed.

A by-pass is given to the trip switch 268 from the control box which causes the rack to advance one space. The nipples are inserted by inactivation of the solenoid permitting spring 266a to drive the nipples into the funnels 258 and 259. Solution is pumped through for a fixed time and the solenoid is then activated to withdraw the nipples, the rack advances to the next spacer extension 262.

The cycle is then repeated. This continues until the whole rack has been processed. This is described in U.S. Pat. application Ser. No. 156,285. A second rack then advances to take its place. The operator then removes the capillaries from the first rack and it can be reutilized after discarding the capillaries.

FIG. 10c shows the capillary 47 in place and the plastic nipples 265 and 269 pushed forward so as to make a continuous flow system, from wash fluid to peristaltic pump 11 and tube 18 through the first nipple 269, the capillary 47, the second nipple 265 and finally to the analysis area.

As hereinbefore described, a cam and switch arrangement FIG. 5a is used to give a by-pass.

A by-pass from the control box FIG. 5a shorts a cam switch 272 causing the motor to be activated by the line current. A cam 276 makes a 180° turn and comes to rest since the cam switch is now open and in series with the line and the motor.

The movement of the first cam pulls back the first plastic nipple 269. The cam 276 is tied to a second cam 278 by sprockets and a ladder chain 271. Thus the second cam also moves 180° simultaneously pulling back the second plastic nipple 265. This releases the rack of FIG. 10a. A by-pass trip switch from the control box FIG. 5a permits the rack to be pushed forward one space.

A by-pass to the first cam from the control box causes the cam to rotate 180° and again insert both nipples 269 and 265 into the soft rubber capillary support. The flow of fluid starts through the capillary and the process is repeated. Solenoids may be used in place of the motor to retract or insert the nipple into the funnels of the soft rubber capillary support.

An improved verson of the concept of FIG. 10b is shown in 11a and 11b. The molded soft rubber forms are stacked, as in FIG. 10b, with a metal spacer between them.

In the instrument of FIG. 10b, it is apparent that when the rack 261 moves forward, then the nipple 269 needs to move back. During this period of time of movement, any liquid which communicates with this tube will tend to flow out if the liquid reservoir is higher than the nipple, or will tend to move back if the reservoir is lower than the nipple. In addition, during the period of the movement of the instrument of FIG. 10b forward, there is a period when the pumping action on the tube leading from the nipple 265 will be pumping air, and in a continuous system of analysis, this may cause difficulty. In order to correct this system, a modification is shown in FIG. 11a whereby intermediate to the movement between the capillaries the entrance nipple and the outlet nipple are sealed flush against a plastic wall 286, which is tied to the rack 262. As this wall slides along from capillary to capillary, the system is sealed between capillaries so that no flow of liquid can take place. This is accomplished by using plates 280a and 280b which are spring-loaded by springs 283a and 283b so that as the rack moves forward, this plate will adjust, if there are any irregularities in the rack. At the same time it maintains tension against the rack. Attached to plate 280 are tubes 268a and 268b by means of nipples 283b and 283a. The nipple is surrounded by an O-ring, not shown, so that it makes close contact when it reaches the particular opening in the rack leading to the capillary.

To insure that the rack comes into the correct place, index points 289 are used. These index points 289 are little pins which fit into depressions 288 in the rack, and which line up the rack. In order to insure that this lineup takes place, a littel metal plate switch 287, activated when pins 257 fall into the depressions, is used. Switch 287 is spring-loaded so that it signals the motor drive through chain 289 and pusher 290, when to stop.

Springs 283a and 283b have stops 282a and 282b so as to compress the springs when the plate moves back. The track 285 on which the rack slides has a nonmovable rigid support 284.

The capillaries 47, just as in FIG. 10b, are located in rubber containers with the outlets as shown in FIG. 10b communicating eventually with tube 286 so as to allow the flow of liquid through the capillary when the particular capillary comes into place.

The capillaries are held by a rubber holder 260. There is a spacer plate 259 between the rubbers so that they can move back and forth. To convert the sides to smooth sides, a plastic attachment 286 is used.

FIG. 11b is an enlarged view of the system showing how the rack lines up. In FIG. 11b, apertures or depressions 288 in the plastic wall 286 are shown. In the spring-loaded system, pins 289 fit into these apertures or depressions. The capillary 47 and the tube leading to the capillary carrying the liquid are aligned at a discharge station 283. The rubber tubing 268 is attached to the nipple and leads to the reservoir of liquid being pumped. The tube 268a leads to the peristaltic pump. Spring loaded plate 280 is held by a post 281. This post allows the plate 280 to move back and forth and maintains the plate tense against the smooth surface of plate 286. The rack slides forward on base 285.

A variation of this system, which has proven to be very effective, is a system which permits easy loading and unloading of capillaries. The principle is the same as in FIG. 11a, except that the rack shown in FIG. 11a has been replaced with a solid plastic block (FIG. 12), e.g., Lucite. The solid block has capillary tubes or beds 204 drilled through it from one end to the other, approximately 1/16 inch bore, so that a glass or plastic capillary 47 can be inserted. The capillary is pushed into one of these openings. There is a flare 302 at the entrance so that the capillary 47 is easily inserted. This flare has an additional purpose as will soon be shown. The capillary 47 rests in place on the bed, in the Lucite block. It will be noticed, also, that there were three tiers in the plastic block 302, 302a, 302b. The purpose of this is so that three capillaries can be processed simultaneously, in a vertical mode. Instead of the plate being flexible or spring-loaded, as in FIG. 11a, the nipples 306, 307, 308 and 306', 307' and 308' are spring-loaded, so that each can move back and forth independently. The nipples are mounted in flat plates 305 and 313 on both sides of the block. When the plates 305 and 313 are brought against the plastic block, these nipples will move back as the plastic block is pushed in place, and by means of the spring 303 maintain tight contact against the plastic block.

The chemical solution being used may be the same solution or three different solutions, coming through tubes 314, 315 and 316 and communicating with nipples 306', 307' and 308'. On the other side of the block, the solution passes to outlet tubing 310, 311 and 312 through nipples 309, 309a and 309b.

FIG. 12a is an enlarged view of the tip of the nipple, its construction and its loading, so as to indicate better its operation. In practice, the individual loads the capillaries by touching them to a solution and allowing the solution to run into the capillary and wipes them. He then inserts the capillaries into these holes, not being careful exactly where he locates them, as long as they are totally within the confines of the plastic wall. The plastic block is then inserted and the nipples 306, 307, 308 and 306', 307' and 308' are pushed back by the movement of the plastic block into position. The nipples are held tightly in position against the plastic block. At the signal from the control mechanism the drive motor pushing chain 289 is activated and moves the plastic block forward. When these nipples reach the opening, the nipples 308, 307, 306 and 308', 307' and 306' will move forward into the flare of the opening 302. Each of these nipples on each side activate a switch 217. These switches are all in series and normally open so that if pressure is released, the instrument will stop. The movement of the nipples forward breaks contact and causes the instrument to stop in position. The pump is activated, pumping the solutions required, and by using a peristaltic pump, the three tubes in the pump attached to the exit side move the sample and wash fluid simultaneously to three separate containers so that analysis can proceed. As an alternative, the entrance tubes 314, 135 and 316, can be attached to the outlet of a multiple dispenser, as previously described in the previous U.S. Pat. No. 3,837,534, and when the block moves into the position, the dispenser is activated squirting through a measured amount of liquid. On the other side, the three tubes are then disposed over test tubes in a moving test tube rack, as has been described in U.S. Pat. No. 3,802,782 and empties the contents from the dispenser into the test tubes. The test tubes in the rack move over one position to the next row and the plastic block moves into the various test tubes. As a result, one obtains a series of test tubes in rows of three in the case shown, each containing a different serum with diluting fluid or reagents so that analysis can proceed at a rapid rate.

A major advantage of the apparatus of FIG. 12 over the instrument of FIG. 10b and 11a is the fact that it is relatively easy to use a multiplicity of capillaries. It is also easier to load the plastic block than it is to load the other system of FIG. 10b and 11a. Further, the tubes or beds themselves may be used as capillaries. In this case, one dispenses with the glass or plastic capillary inserts and adds a measured amount of sample to each of the "beds", which are in effect, capillaries open at both ends. In this case it is advantageous to drill a larger hole in the block and insert a plastic tube (e.g., Teflon of IEP) with a narrow bore. In this way, by using tubing of different bore, the same block may be used for different volumes.

The nipple 306 is inserted into the flare 302 of the opening of the plastic block. An O-ring 218 insures the seal by abutting against the flat surface in the flare 302, of the plastic block 301. 47 is the capillary in place. 303 is an extension spring, so that under normal circumstances it will pull the nipples forward but when the plastic block moves from one position to another, the nipple will be pushed back, in the same way as a detent is pushed back in similar systems. The spring 303 insures tight connection. Also, when nipple 306 moves forward, it breaks the electrical connection 317, which stops the motor in place and permits a series of operations to take place which permits the analysis of material contained in the capillary. The nipples are supported by non-movable rigid plates 313a and 313b.

This system can be used for any number of nipples in a vertical mode. For example, in analysing a sample for several components, one picks up three or four capillaries, depending upon the number of vertical beds in the plastic block being used, and dips them into the serum simultaneously. By capillarity, the capillaries fill themselves. The operator then wipes off the excess on the outside and inserts each into the beds in the plastic block vertically. When these come into position, this multiplicity of samples will each have its own pathway so that by utilization of a dispenser which has been previously described in U.S. Pat. No. 3,837,534 where each syringe can deliver different reagents and different amounts of these reagents, it is possible to deliver the contents of these capillaries into test tubes, each separately and each analyzing the different component of the serum. In effect, FIG. 12 illustrates a rapid method of simultaneously doing a multiplicity of analyses on the same specimen. In place of the dispenser, this instrument can be used in the other stated mode, where a peristaltic pump is placed at the outlet and by means of pumping three tubes simultaneously it is possible to set up three lines of analysis, each independent of the other, and each containing the contents of one of the capillaries.

Where the plastic block itself is used as an assembly of capillaries, the beds or tubes open at both ends are bored to approximately 1mm bore or less so as to hold microliter amounts of specimens. Holding the block so that the capillary beds are in a vertical mode a small drop of sample is placed at each opening. The capillary fills itself by capillarity and in effect measures out a volume. The excess is wiped off and one proceeds as before with the inserted capillaries. One then may load these capillaries directly or load them indirectly, by inserting glass or plastic capillaries containing the sample. The effect is the same. In actual practice the inserting of capillaries containing the sample is faster and serves to conserve sample, there being no wastage.

While the capillary may be emptied by washing out with water or a reagent into an analytical system, air may be used where required. If the inserts in the block are made of Teflon and the specimen is placed therein and if the outlet tubes are also Teflon, a blast of air will blow the sample out quantitatively to a container since the specimen will not wet the walls of the Teflon.

I claim:

1. An arrangement for introducing minute quantities of liquids into an analytical system for assay of its components comprising in combination
    a. moving means going along a predetermined travel path to a work station said moving means having thereon a retaining block horizontally bored to form capillaries open at both ends in said block, so that a liquid sample may be inserted into said capillary;
    b. means for sequentially presenting said capillaries to said work station;
    c. sealing means operatively connected to said moving means and said work station for sequentially sealing the capillaries into said work station without leakage during the travel from capillary to capillary; and,
    d. inlet and outlet tubes attached to said sealing means so as to provide a continuous path for liquid flow from inlet tube to capillary to outlet tube, so that the contents of the capillary may be moved to the analytical system by a flow of fluid.

2. An arrangement as claimed in claim 1, wherein said retaining block is bored for more than one capillary in vertical alignment and a corresponding number of sealing means operatively connected to said moving means and said work station for sequentially sealing the capillaries in vertical alignment simultaneously and linking them in a continuous flow system to separate inlet and outlet tubes so that the contents of each of said capillaries in vertical alignment may be transferred to each of separate analytical systems for multiple simultaneous analysis for various components in the samples.

3. An arrangement as claimed in claim 2 wherein said moving means is a rectangular rack having two flat outer walls and having therein resilient bed forms shaped and disposed to receive capillaries therein, first and second plates at said work station having connecting tubing terminating therein, said plates being disposed on both sides of said rack walls as the walls pass said work station so that said capillaries will be horizontally aligned with said tubing and spring means constantly biasing said plates against said walls to seal said inlets, outlets and wall against leakage.

4. An arrangement as claimed in claim 3 wherein said rack is a solid plastic rectangular rack and said plate is a solid flat plate disposed to engage said rack having thereon a plurality of nipples disposed to engage said inlets and outlets with spring means urging said nipples into contact with said inlets, outlets and said rack wall.

5. An arrangement as claimed in claim 1 including dispenser means operatively coupled to said inlet tube.

6. An arrangement as claimed in claim 1 including a peristaltic pump operatively coupled to said outlet tube.

7. A method for introducing minute quantities of liquids into an analytical system comprising the steps of
    a. introducing said liquids to capillaries;
    b. disposing said capillaries in a horizontal row on moving means;
    c. moving said moving means along a travel path to a work station to sequentially present said capillaries while sealing said capillaries against leakage;
    d. ejecting said sample at said work station by coupling inlet and outlet tubes to the capillaries; and,
    e. permitting a wash solution to flow across said inlet, outlet tubes and capillaries to an analytical system for analysis.

8. A method as claimed in claim 7 wherein said capillaries are disposed on a block which serves as moving means.

9. A method as claimed in claim 7 wherein said wash solution is squirted into the inlet tube by a syringe.

* * * * *